United States Patent
Tuken et al.

(10) Patent No.: US 9,528,417 B1
(45) Date of Patent: Dec. 27, 2016

(54) SYSTEM AND METHOD FOR DETECTING TAILPIPE AMMONIA SLIP

(71) Applicant: Deere & Company, Moline, IL (US)

(72) Inventors: Taner Tuken, Cedar Falls, IA (US); Christian Duesseldorf, Weisenheim am Berg (DE); Michael J. Pipho, Dunkerton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/843,423

(22) Filed: Sep. 2, 2015

(51) Int. Cl.
- *F01N 3/00* (2006.01)
- *F01N 3/20* (2006.01)
- *F01N 3/08* (2006.01)
- *F01N 11/00* (2006.01)

(52) U.S. Cl.
CPC ............. *F01N 3/208* (2013.01); *F01N 3/0814* (2013.01); *F01N 3/0842* (2013.01); *F01N 3/206* (2013.01); *F01N 11/002* (2013.01); F01N 2560/021 (2013.01); F01N 2560/026 (2013.01); F01N 2560/06 (2013.01); F01N 2560/07 (2013.01); F01N 2610/02 (2013.01); F01N 2610/1406 (2013.01); F01N 2610/1433 (2013.01); F01N 2610/1453 (2013.01); F01N 2900/0412 (2013.01)

(58) Field of Classification Search
CPC ........ F01N 3/208; F01N 3/0842; F01N 3/206; F01N 3/0814; F01N 11/002; F01N 2610/02
USPC .......................................................... 60/295
See application file for complete search history.

(56) References Cited

U.S. PATENT DOCUMENTS

| | | | |
|---|---|---|---|
| 2009/0301066 A1 | 12/2009 | Sindano et al. | |
| 2010/0257844 A1* | 10/2010 | Shimomura | F01N 3/208 60/277 |
| 2011/0047964 A1* | 3/2011 | Yezerets | F01N 3/2066 60/273 |
| 2011/0072798 A1 | 3/2011 | Herman | |
| 2011/0239627 A1 | 10/2011 | Sisken et al. | |
| 2013/0276427 A1* | 10/2013 | Doering | F01N 13/02 60/273 |
| 2013/0298533 A1* | 11/2013 | Kowalkowski | F01N 11/00 60/276 |
| 2014/0208721 A1* | 7/2014 | Khaled | F01N 3/103 60/276 |
| 2014/0301925 A1* | 10/2014 | Korpics | B01D 53/9495 423/212 |
| 2015/0020530 A1* | 1/2015 | Pandey | F01N 3/208 60/772 |

(Continued)

*Primary Examiner* — Jason Shanske
(74) *Attorney, Agent, or Firm* — Michael Best & Friedrich LLP (57) ABSTRACT

System and method of treating exhaust gas from an internal combustion engine using selective catalytic injection and a modulated supply of diesel exhaust fluid. The modulated supply of diesel exhaust fluid induces variations in nitrogen oxides exiting a selective catalytic reduction chamber. An electronic control unit inputs a signal from a sensor that senses the variations in nitrogen oxides. The signal is filtered at the modulation frequency to isolate peak-to-peak variations in the signal caused by the modulated diesel exhaust fluid supply. Based on whether the peak-to-peak variations are above a threshold thus indicating a predominance of nitrogen oxides over reductant, the electronic control unit adjusts the supply of diesel exhaust fluid.

20 Claims, 10 Drawing Sheets

(56) References Cited

U.S. PATENT DOCUMENTS

2015/0075143 A1\* 3/2015 Gong ................ F01N 3/208
 60/301

\* cited by examiner

SYSTEM AND METHOD FOR DETECTING TAILPIPE AMMONIA SLIP

BACKGROUND

The present disclosure relates to exhaust systems and associated controls for regulating emissions through the use of selective catalytic reduction.

SUMMARY

Selective catalytic reduction (SCR) is a process for converting nitrogen oxides ($NO_x$) naturally present in exhaust gas of an internal combustion engine. Since $NO_x$ are known to be harmful to the environment, SCR systems convert $NO_x$ into less harmful compounds. Diesel exhaust fluid (DEF) provides a reducing agent that, when combined with a catalyst, reduces the $NO_x$. The DEF may provide ammonia ($NH_3$) for use as the reducing agent. In such a system, if DEF is over-injected, $NH_3$ may pass unreacted through an SCR chamber and result in $NH_3$ at an output of the SCR system. This condition is known as $NH_3$ slip.

A sensor at the output of the SCR chamber detects amounts of $NH_3$ in the exhaust gas and transmits a signal to an electronic control unit (ECU). However, some sensors that detect $NH_3$ also react to the presence of $NO_x$. Unless a sensor specifically sensitive only to $NH_3$ is used, the sensor responds to both $NO_x$ and $NH_3$ approximately equally (e.g., a common $NO_x$ sensor). Since $NH_3$ reduces $NO_x$ in the catalyst, $NO_x$ and $NH_3$ are typically not both present in significant amounts at the output of the SCR catalyst. Therefore, the signal of the sensor is generally dependent on the presence of either $NO_x$ or $NH_3$. However, since the reaction by the sensor is similar to both $NO_x$ and $NH_3$, the electronic control does not naturally distinguish between a sensor signal due to $NO_x$ and a sensor signal due to $NH_3$.

As described herein, the electronic control unit operates to determine whether the output of the sensor is indicative of $NO_x$ or $NH_3$ present in the exhaust gas at the output of the SCR catalyst and adjusts the amount of DEF supply according to the determination. The electronic control unit modulates a supply of DEF at a known frequency. Using a band-pass filter, the electronic control unit analyzes the sensor signal at the known frequency of DEF modulation. Variations in the signal at the known frequency are dependent on whether the SCR system is experiencing $NH_3$ slip. The electronic control unit determines whether $NO_x$ or $NH_3$ is present in the exhaust gas output from the SCR catalyst based on the variations in the signal at the known frequency. Embodiments of the disclosure utilizing the above principals are summarized below.

In one embodiment, the disclosure describes an exhaust gas treatment system for an internal combustion engine including an exhaust gas pathway that is configured to receive exhaust gas from the internal combustion engine. A diesel exhaust fluid (DEF) injector is connected to the exhaust gas pathway and configured to inject diesel exhaust fluid into the exhaust gas pathway. A selective catalytic reduction (SCR) catalyst is positioned downstream of the diesel exhaust fluid injector. A sensor is positioned downstream of the SCR catalyst, and the sensor outputs a signal indicative of an amount of any nitrogen oxides and ammonia present in the exhaust gas. An electronic control unit (ECU) is configured to modulate an amount of DEF that is injected into the exhaust gas pathway at a known frequency. The ECU receives the signal from the sensor and filters the signal based on the known frequency. Then, the ECU analyzes the filtered signal to determine a component of the signal associated with the known frequency. The ECU determines that the signal is indicative of an amount of nitrogen oxide when the component of the filtered signal is above a threshold, and the ECU determines that the signal is indicative of an amount of ammonia when the component of the filtered signal is below the threshold.

In another embodiment, the disclosure describes a method of controlling an exhaust gas aftertreatment system including diesel exhaust fluid (DEF). The method includes modulating an amount of diesel exhaust fluid (DEF) that is injected into an exhaust gas pathway at a known frequency. A signal is received from a sensor downstream of a point of injection of the DEF and the signal is filtered based on the known frequency. The filtered signal is analyzed to determine a component of the signal associated with the known frequency. The filtered signal is then compared to a threshold, and it is determined that the signal is indicative of an amount of nitrogen oxide when the component of the filtered signal is above the threshold. Conversely, when the component of the filtered signal is below the threshold, it is determined that the signal is indicative of an amount of reductant.

Other features and aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or being carried out in various ways. Also, it is to be understood that the phraseology and terminology used herein is for the purpose of description and should not be regarded as limiting.

It should be noted that the term electronic control unit refers to hardware-based control circuitry integrated into an electronic control unit for executing instructions to perform the methods described herein. For example, the electronic control unit may include a microprocessor, microcontroller, or other computing device. The electronic control unit may include one or more electronic processing units, one or more memory modules including a non-transitory computer-readable medium, one or more input/output interfaces, one or more output drivers, one or more relays, and various connections (e.g., a system bus) connecting the components.

Figure 1:
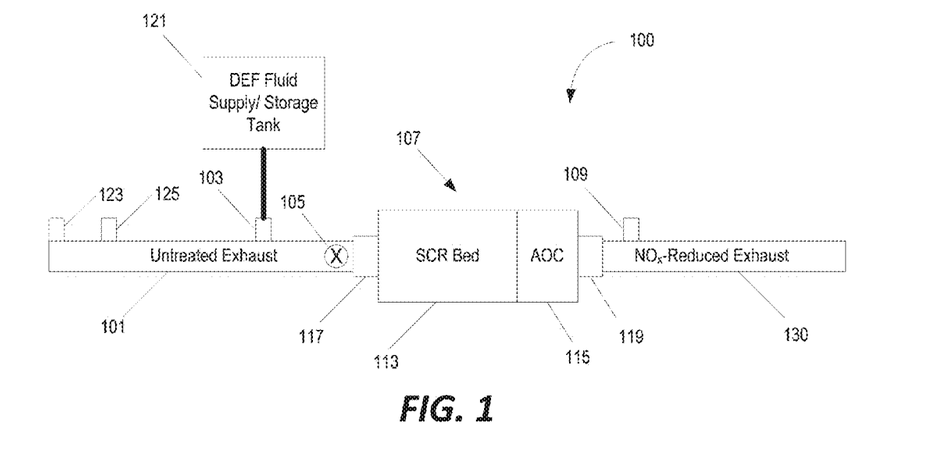
FIG. 1 is a schematic diagram of an exhaust aftertreatment system for an internal combustion engine.

FIG. 1 is an example of an exhaust gas aftertreatment system 100, which uses diesel exhaust fluid (DEF) to reduce nitrogen oxide ($NO_x$) emissions. DEF acts as a reductant (i.e., reducing agent) and may include, for example, anhydrous ammonia, aqueous ammonia, or urea. The exhaust gas aftertreatment system 100 includes an exhaust pathway 101 (e.g., an exhaust pipe) that includes a DEF injector 103, a mixer 105, a selective catalytic reduction reaction chamber (SCR chamber 107), a sensor 109, and a tailpipe 111. The SCR chamber 107 includes a selective catalytic reduction bed (SCR bed 113), an ammonia oxidizing catalyst (AOC 115), an inlet 117, and an outlet 119. The exhaust gas aftertreatment system 100 also includes a DEF supply 121, which includes a DEF tank fluidly connected to the DEF injector 103. The DEF supply 121 may include a variable pump or valve for controlling an amount of DEF sent to the DEF injector 103. The exhaust pathway 101 may be connected to an internal combustion engine (not illustrated) and configured to direct exhaust gas through the exhaust gas aftertreatment system 100. A flow sensor 123 and a temperature sensor 125, both of which are optional in some implementations, may be connected to the exhaust pathway 101 for monitoring the characteristics of the exhaust gas. Although illustrated upstream of the SCR chamber 107, the flow sensor 123 and the temperature sensor 125 may be positioned in various locations in the exhaust pathway including after the SCR chamber 107. The outlet 119 of the SCR chamber 107 is connected to a tailpipe 130, which emits treated exhaust gas from the exhaust gas aftertreatment system 100.

In operation, exhaust gas from the internal combustion engine is directed into the exhaust pathway 101. The DEF injector 103 is located downstream of an inlet of the exhaust pathway 101. The DEF injector 103 injects DEF from the DEF supply 121 into the exhaust pathway 101. The DEF supply 121 controls the rate at which the DEF is injected into the exhaust gas. The DEF supply 121 may control the rate of injected DEF through various mechanisms including, for example, a variable pump or a variable control valve. Ammonia ($NH_3$) from the injected DEF and the exhaust gas are mixed in the mixer 105 downstream from the DEF injector 103. The $NH_3$ reacts with $NO_x$ present in the exhaust gas. $NO_x$ is converted based on the amount of injected DEF (i.e., the amount of $NH_3$ provided by the injected DEF). Any excess $NH_3$ is treated in the AOC 115 of the SCR chamber 107 before the exhaust gas is emitted from the exhaust pathway 101. Downstream of the SCR chamber 107, the sensor 109 senses a composition of the exhaust gas. In particular, the sensor 109 detects amounts of $NO_x$ and $NH_3$ present in the exhaust gas. The sensor 109 may be a $NO_x$ sensor designed to detect $NO_x$ within the exhaust gas. However, the $NO_x$ sensor is also sensitive to $NH_3$ and produces a signal indicative of an amount of both $NO_x$ and $NH_3$. Therefore, an increase in either $NO_x$ or $NH_3$, will increase the magnitude of the signal of the sensor 109. In some embodiments, the flow sensor 123 senses an exhaust gas flow rate, and the temperature sensor 125 senses the temperature of the exhaust gas, which enables tuning of the exhaust gas aftertreatment system 100 to varying engine conditions.

Figure 2:
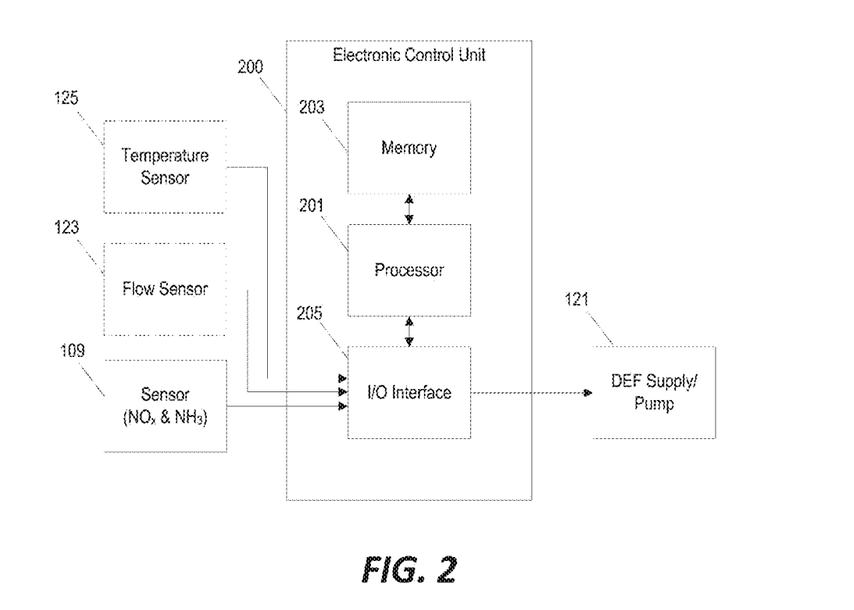
FIG. 2 is a block diagram of an electronic control unit for the modulated exhaust aftertreatment system of FIG. 1.

FIG. 2 illustrates an example of an electronic control unit (ECU 200) for control of the exhaust gas aftertreatment system 100. The ECU 200 includes a plurality of electrical and electronic components that provide power, operational control, and protection to the components and modules within the ECU 200. In particular, the ECU 200 includes, among other things, an electronic processor 201 (e.g., a programmable microprocessor, microcontroller, or similar device), non-transitory, machine-readable memory 203, and an input/output interface 205. The electronic processor 201 is communicatively coupled to the memory 203. The electronic processor 201 is configured to retrieve from memory 203 and execute, among other things, instructions related to the control processes and methods described herein. In particular, the electronic processor 201 executes a program or algorithm stored in memory 203 to perform the methods illustrated in FIGS. 4, 5, and 12. In other embodiments, the ECU 200 includes additional, fewer, or different components. The ECU 200 may also be configured to communicate with external systems including, for example, engine controls and/or operator controls. In embodiments that do not have a flow sensor 123 and a temperature sensor 125, the ECU 200 may use modeling techniques to estimate a flow rate and a temperature of the exhaust gas or may use predetermined values.

The ECU 200 is communicatively coupled to the sensor 109, the DEF supply 121, the temperature sensor 125, and the flow sensor 123. The ECU 200 receives a signal input from the sensor 109 indicative of the amount of $NO_x$ and $NH_3$ present in the exhaust gas. In some embodiments, the ECU 200 also receives signals indicative of temperature of the exhaust gas and flow rate of the exhaust gas from the temperature sensor 125 and the flow sensor 123, respectively. The input/output interface 205 coordinates communications between the ECU 200 and the DEF supply 121. Through the input/output interface 205, the ECU 200 sets the DEF supply 121 to obtain a desired dosing of DEF. The input/output interface 205 also coordinates input communications to the ECU 200 from the sensor 109, the flow sensor 123, and the temperature sensor 125.

Figure 3:
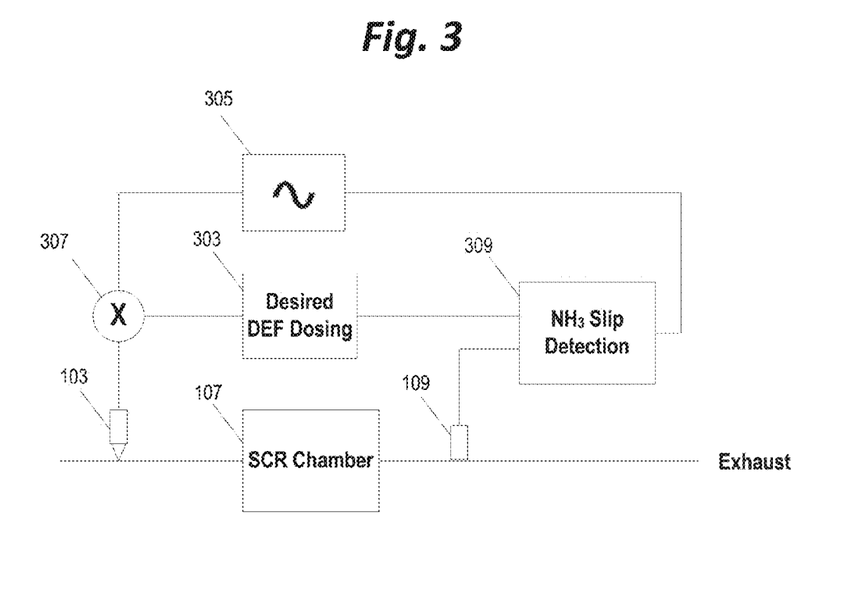
FIG. 3 is a flow diagram of the operation of the exhaust gas aftertreatment system of FIG. 1.

FIG. 3 is an example of a control flow for the exhaust gas aftertreatment system 100. The DEF injector 103 injects DEF into the exhaust gas based on a combination of a desired DEF dosing 303 and a modulation signal 305. In some embodiments, the combination may be formed with a multiplier 307. In other embodiments, the combination may be a summation. In the multiplier 307, the modulation signal 305 continuously excites the desired DEF dosing 303. In particular, the modulation signal 305 may be sinusoidal and may modulate the desired DEF dosing 303 based on a predetermined amplitude and frequency of the sinusoid. In such a case, at a positive peak of the sinusoid, the amount of DEF that is injected is the desired DEF dosing 303 plus an amount of DEF indicated by the magnitude of the peak of the sinusoid, and, at a negative peak of the sinusoid, the amount of DEF that is injected is the desired DEF dosing 303 minus an amount indicated by the magnitude of the negative peak of the sinusoid. For example, the desired DEF dosing 303 may be adjusted by 20 to 30 percent at the positive and negative peaks. In other words, the DEF dosing at the peaks may be 20 to 30 percent higher or lower than the average value of injected DEF. The DEF is modulated in a sinusoidal manner such that the amount of injected DEF over time remains the same as that without modulation. In addition, the modulation signal 305 may be set by the ECU 200 at various frequencies including, for example, a frequency of 1/40 Hertz. Other amplitudes and frequencies are also possible depending on the needs of the particular configuration.

The ECU 200 may set the desired DEF dosing 303 by reading a predetermined value from memory 203 or it may calculate a value based on feedback control from the sensor 109. In the case of feedback control, the feedback may include a proportional, integral, differential (PID) gain control. In other embodiments, the desired DEF dosing 303 is set using open-loop control. For example, the ECU 200 may use a lookup table in the memory 203 to set a desired DEF dosing 303 based on engine parameters or based on an input from an optional $NO_x$ sensor (not illustrated) upstream of the SCR chamber 207. In such a case, the ECU 200 references the lookup table or other predetermined value of DEF dosage based on the $NO_x/NH_3$ level at an engine output. In either closed-loop or open-loop control, the ECU 200 adjusts the desired DEF dosing 303 with a $NH_3$ slip detection algorithm 309 as described in FIG. 4.

Figure 4:
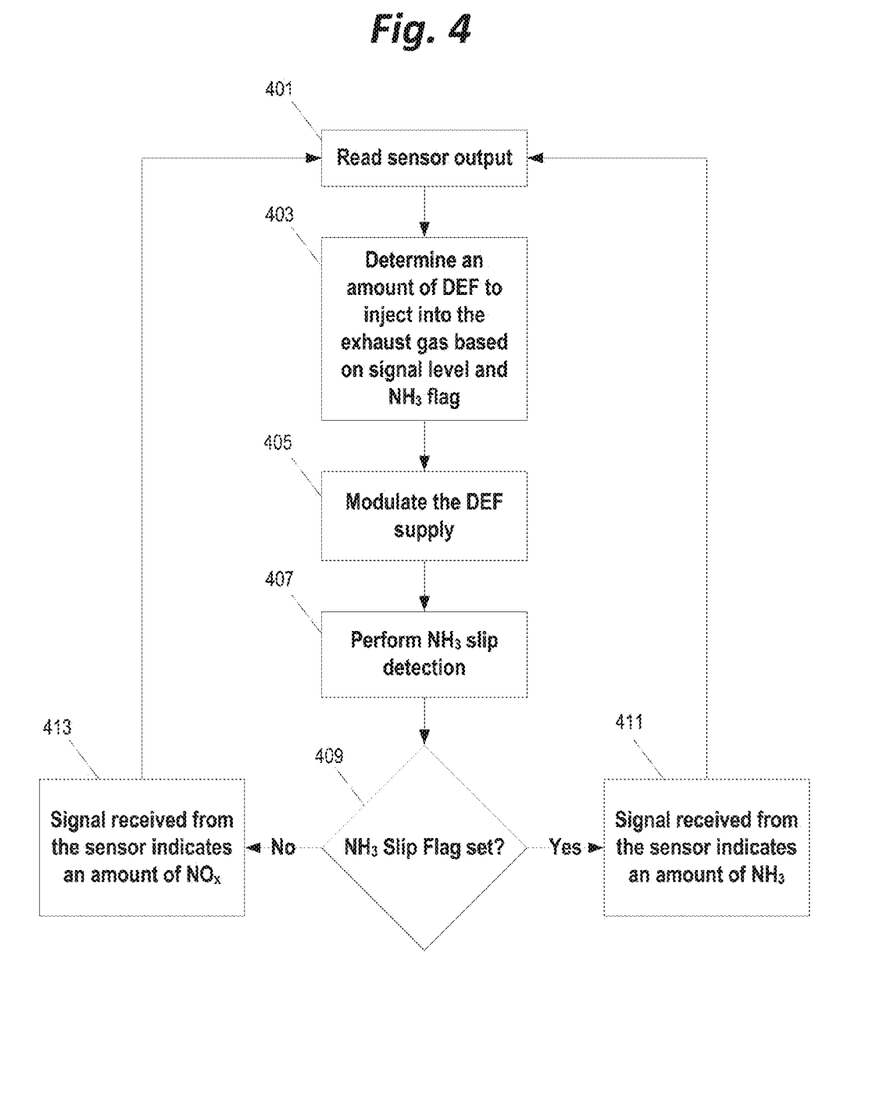
FIG. 4 is a flowchart of a diesel exhaust fluid control method for the exhaust gas aftertreatment system of FIG. 1.
Figure 5:
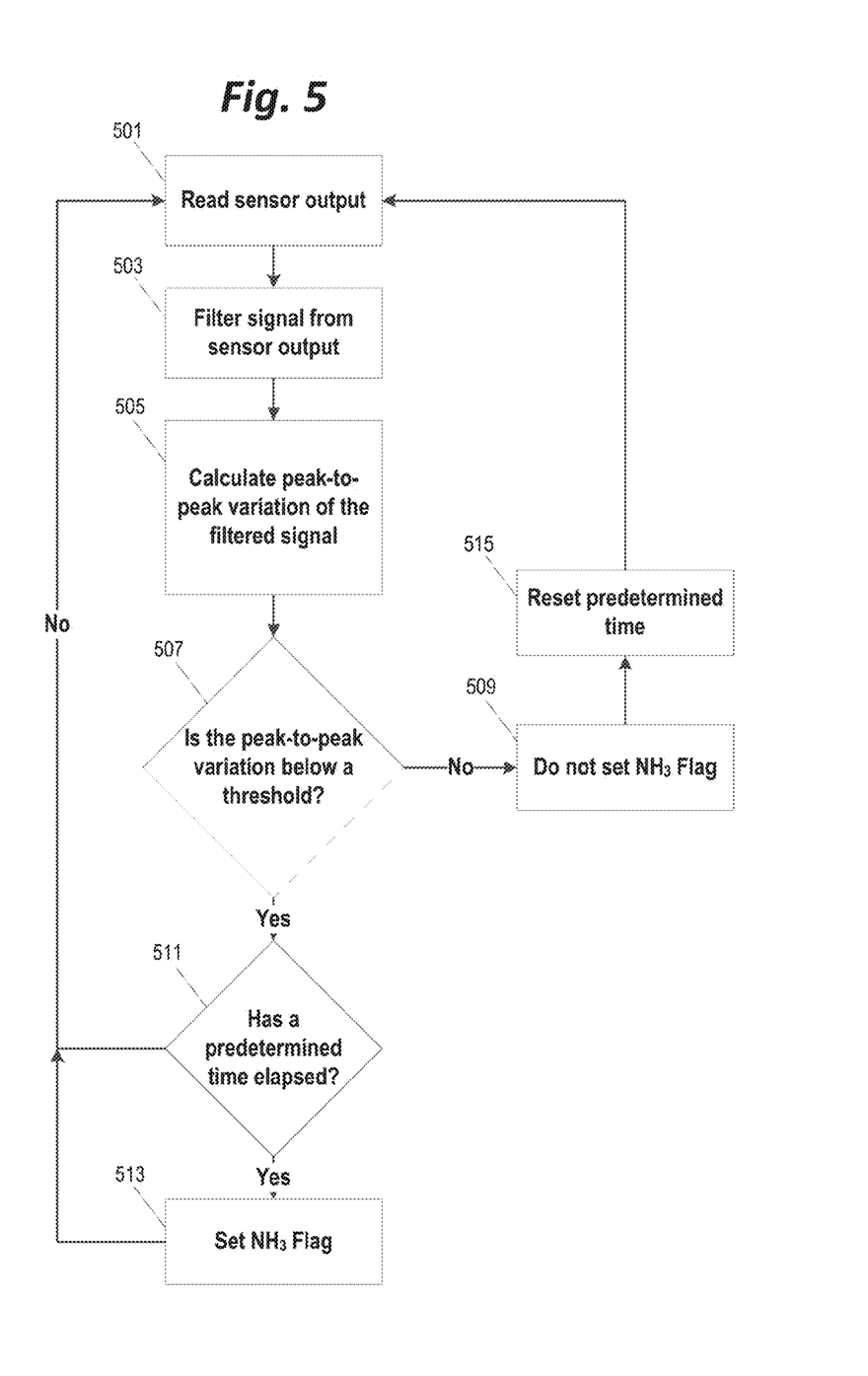
FIG. 5 is a flowchart of an ammonia detection method for the exhaust gas aftertreatment system of FIG. 1

FIG. 4 is a DEF dosage control method 400 based on $NH_3$ detection. The ECU 200 reads a signal from the sensor 109 to determine an amount of combined $NO_x$ and $NH_3$ in the exhaust gas (step 401). The ECU 200 determines an amount of DEF to inject into the exhaust gas based on the signal level of the sensor 109 or, in some embodiments, on a signal level of a NOx sensor upstream of the DEF injector (step 403). The ECU 200 sends a signal to the DEF supply 121 indicating the amount of DEF to inject (step 405). Then, the ECU 200 performs $NH_3$ slip detection as illustrated in FIG. 5 (step 407). If the $NH_3$ slip flag is set (step 409), the ECU 200 determines that the signal received from the sensor 109 indicates an amount of $NH_3$ and that the amount of $NO_x$ in the tailpipe emissions is approximately zero (step 411). If the $NH_3$ flag is not set (step 409), the ECU 200 determines that the signal received from the sensor 109 indicates an amount of $NO_x$ and that the amount of $NH_3$ in the tailpipe emissions is approximately zero (step 413).

The ECU 200 may determine the amount of DEF to inject (step 403) based on the signal level of the sensor 109 and the status of the $NH_3$ flag. For example, when the signal level indicates a high level of $NO_x/NH_3$ and the $NH_3$ slip flag is not set, the ECU 200 may signal the DEF supply 121 for a larger increase of DEF dosing. Conversely, if the signal level indicates a low level of $NO_x/NH_3$ and the $NH_3$ slip flag is not set, the ECU 200 may signal the DEF supply 121 for a lower increase or no change of DEF dosing. Similarly, when the signal level indicates a high level of $NO_x/NH_3$ and the $NH_3$ flag is set, the ECU 200 may signal the DEF supply 121 for a larger decrease in DEF dosing. Lastly, when the signal level indicates a low level of $NO_x/NH_3$ and the $NH_3$ flag is set, the ECU 200 may signal the DEF supply 121 for a smaller decrease in DEF dosing or no change in DEF dosing.

FIG. 5 illustrates a $NH_3$ slip determination method 500. The ECU 200 reads the signal level from the sensor 109 indicating a level of combined $NO_x$ and $NH_3$ (step 501). The ECU 200 filters the signal with a band-pass filter (e.g. a notch filter) tuned to the DEF modulation frequency (step 503). In some embodiments, the ECU 200 sets a center frequency of the band-pass filter to the modulation frequency of the DEF. In one embodiment, the ECU 200 filters the signal based on filter coefficients stored in memory 203 corresponding to each available modulation frequency. Alternatively, in other embodiments, the band-pass filter may be implemented in hardware prior to reading the signal by the electronic processor 201 of the ECU 200. In such a case, the band-pass filter may be located within the ECU 200 or external to the ECU 200. With the filtered signal, the ECU 200 can accurately determine variations in signal level due solely to the modulated, injected DEF. Once the signal is filtered, the ECU 200 calculates a peak-to-peak level of the filtered signal (step 505). The peak-to-peak level is indicative of whether $NO_x$ or $NH_3$ is present in the signal. The ECU 200 compares the peak-to-peak level to a threshold value (step 507). If the peak-to-peak level is higher than the threshold, then the ECU 200 does not set an $NH_3$ flag (step 509). Conversely, if the peak-to-peak level is lower than the threshold, then the ECU 200 determines if a predetermined time has elapsed since determining that the peak-to-peak reading is below the threshold (step 511). If the predetermined time has not lapsed, the ECU 200 continues to monitor the output of the sensor 109 (step 501). If the predetermined time has lapsed, the ECU 200 sets the $NH_3$ flag (step 513). Whenever the peak-to-peak level is above the threshold, the predetermined time is reset (step 515).

The ECU 200 is able to determine whether $NH_3$ slip is occurring based on the peak-to-peak variations. When the peak-to-peak level is low in the filtered signal, it indicates that the $NH_3$ present due to the modulated, injected DEF is not fully reacting within the SCR chamber 107 and $NH_3$ is exiting the outlet 119 of the SCR chamber 107. This condition is known as $NH_3$ slip and indicates an excessive dosing of $NH_3$. When the peak-to-peak level is high in the filtered signal (e.g., when the peak-to-peak level is above the threshold), it indicates that $NH_3$ is not passing through the SCR chamber 107. In this condition, the $NH_3$ is being fully converted before exiting the SCR bed 113 and $NO_x$ is predominant in the exhaust gas. The peak-to-peak variation at the modulation frequency occurs due to the modulated DEF, since the band-pass filter blocks signals at other frequencies. However, interference in the signal at the modulation frequency may falsely indicate a high peak-to-peak level. By waiting the predetermined time, the ECU 200 performs a persistence check to ensure that the peak-to-peak variations are relatively stable. In other words, the persistence check ensures that interference at the modulation frequency does not result in inadvertent setting of the $NH_3$ flag.

In some embodiments, the threshold for the peak-to-peak level is set as a predetermined value in memory 203. In other embodiments, the threshold is variable based on operating conditions of the exhaust gas aftertreatment system 100. For example, a temperature of the SCR bed 113 and the exhaust gas flow rate may influence the amount of $NO_x$, and therefore, the amount of peak-to-peak variation in the filtered signal. To compensate for low peak-to-peak variations, the ECU 200 sets the threshold to be dependent on the temperature of the SCR bed 113 and the exhaust gas flow rate. As the temperature of the SCR bed 113 and the exhaust flow rate decrease, the peak-to-peak level decreases, and the ECU 200 lowers the threshold based on the SCR bed 113 temperature and the exhaust gas flow rate. The ECU 200 monitors the temperature sensor 125 to infer the temperature of the SCR bed 113, and monitors the flow sensor 123 to determine the exhaust gas flow rate. In some embodiments, when the operating temperature and exhaust gas flow rate are normal, the ECU 200 does not perform any adjustment to the threshold. Other parameters may also be considered in adjusting the threshold to compensate for various loading and operating conditions of the internal combustion engine.

Figure 6:
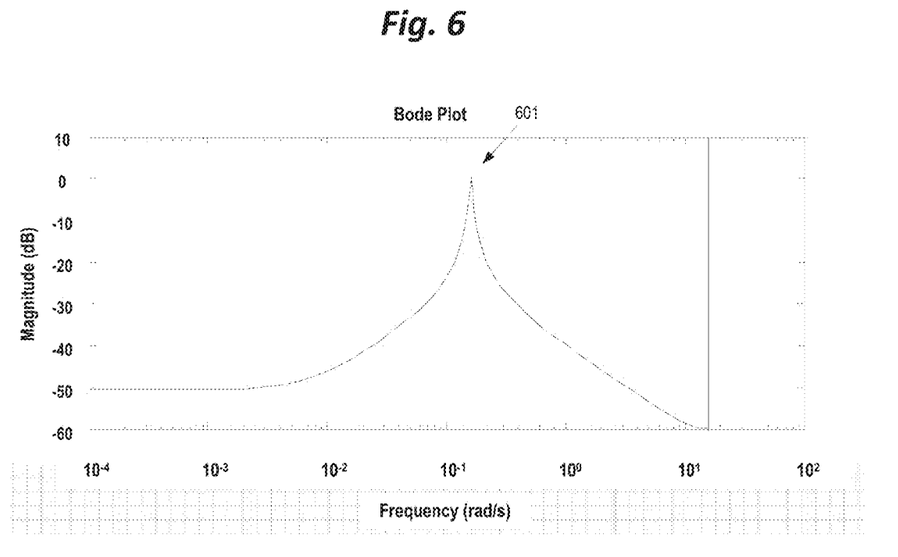
FIG. 6 is a Bode plot of a frequency response of a band-pass filter used in the ammonia detection method of FIG. 5.

FIG. 6 illustrates a frequency response of the band-pass filter for filtering the signal of the sensor 109. The frequency response may be adjusted by the ECU 200 based on the modulation frequency of the DEF injection. A peak 601 in the Bode plot illustrates minimum attenuation at the DEF modulation frequency. At the peak 601, the attenuation approaches zero, while at other frequencies, the attenuation is large (e.g., −50 dB). Consequently, the band-pass filter effectively blocks out peak-to-peak variations of the signal of the sensor 109 that are not at the modulation frequency. Therefore, the band-pass filter attenuates peak-to-peak variations that may be caused from other engine or exhaust aftertreatment components. Attenuation of the peak-to-peak variations at other frequencies substantially improves the sensitivity of the peak-to-peak value determination at the modulation frequency.

Figure 7:
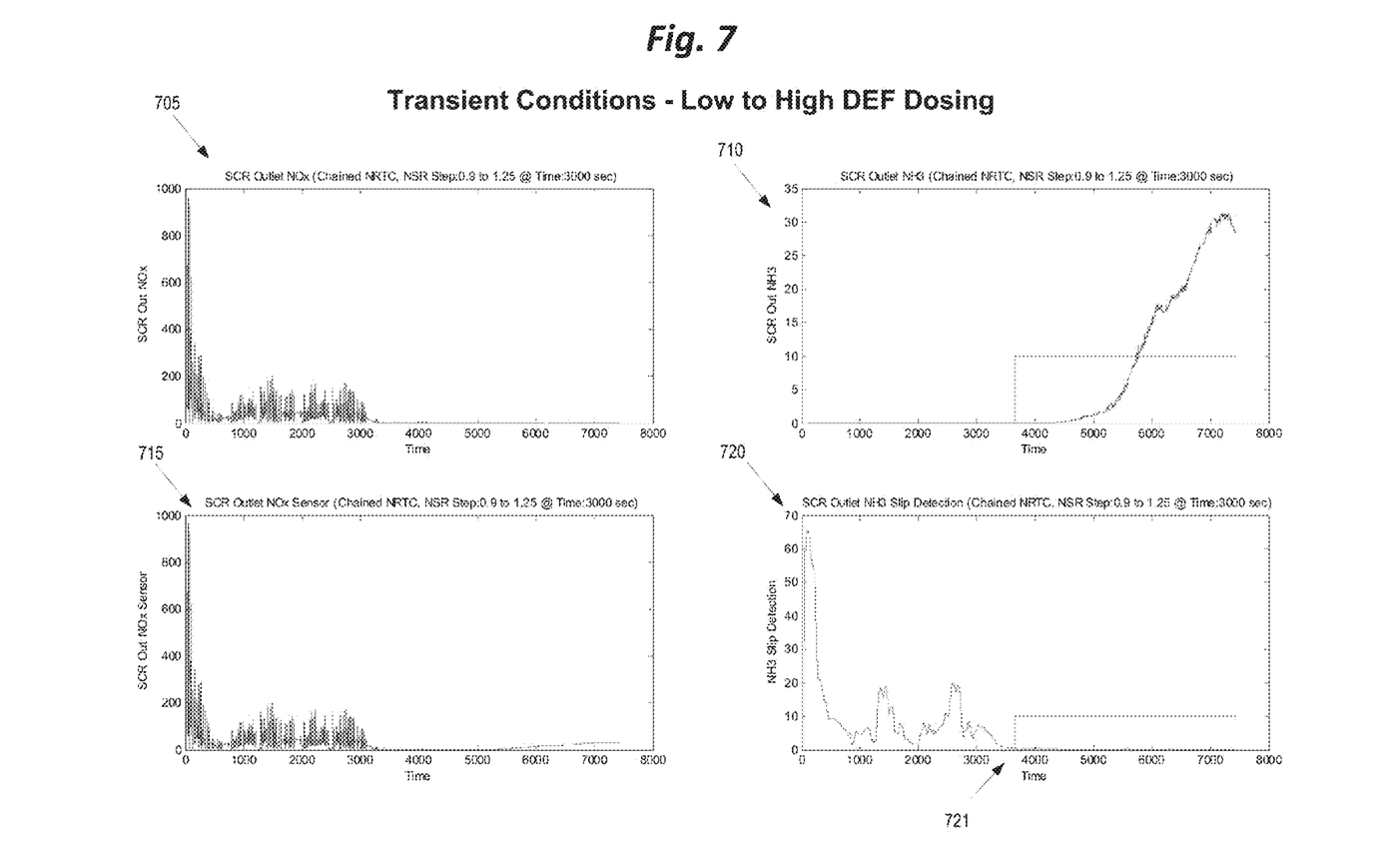
FIG. 7 is a set of graphs illustrating exhaust gas characteristics of the exhaust gas aftertreatment system of FIG. 1 when increasing diesel exhaust fluid dosing during transient engine conditions.
Figure 8:
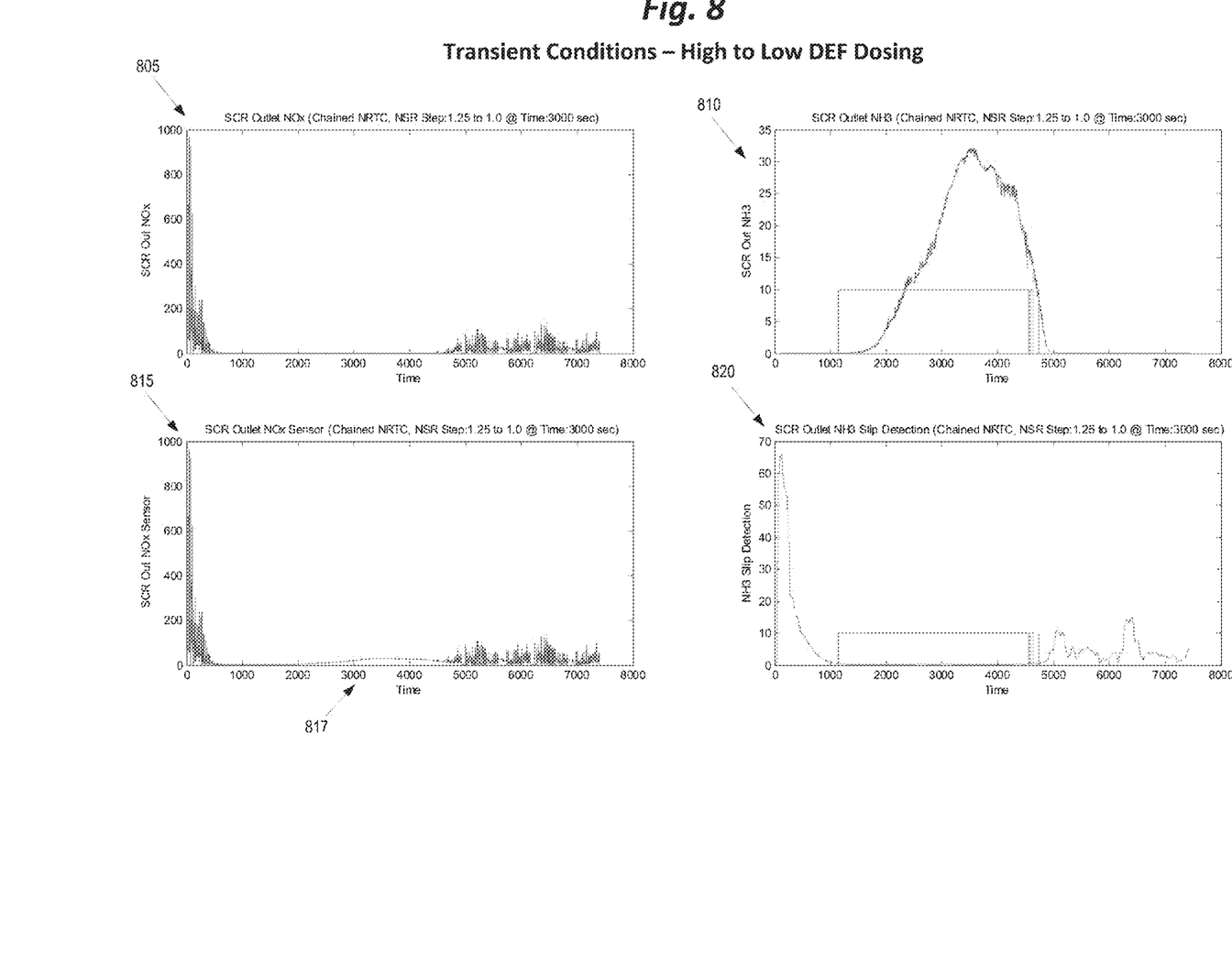
FIG. 8 is a set of graphs illustrating exhaust gas characteristics of the exhaust gas aftertreatment system of FIG. 1 when decreasing diesel exhaust fluid dosing during transient engine conditions.
Figure 9:
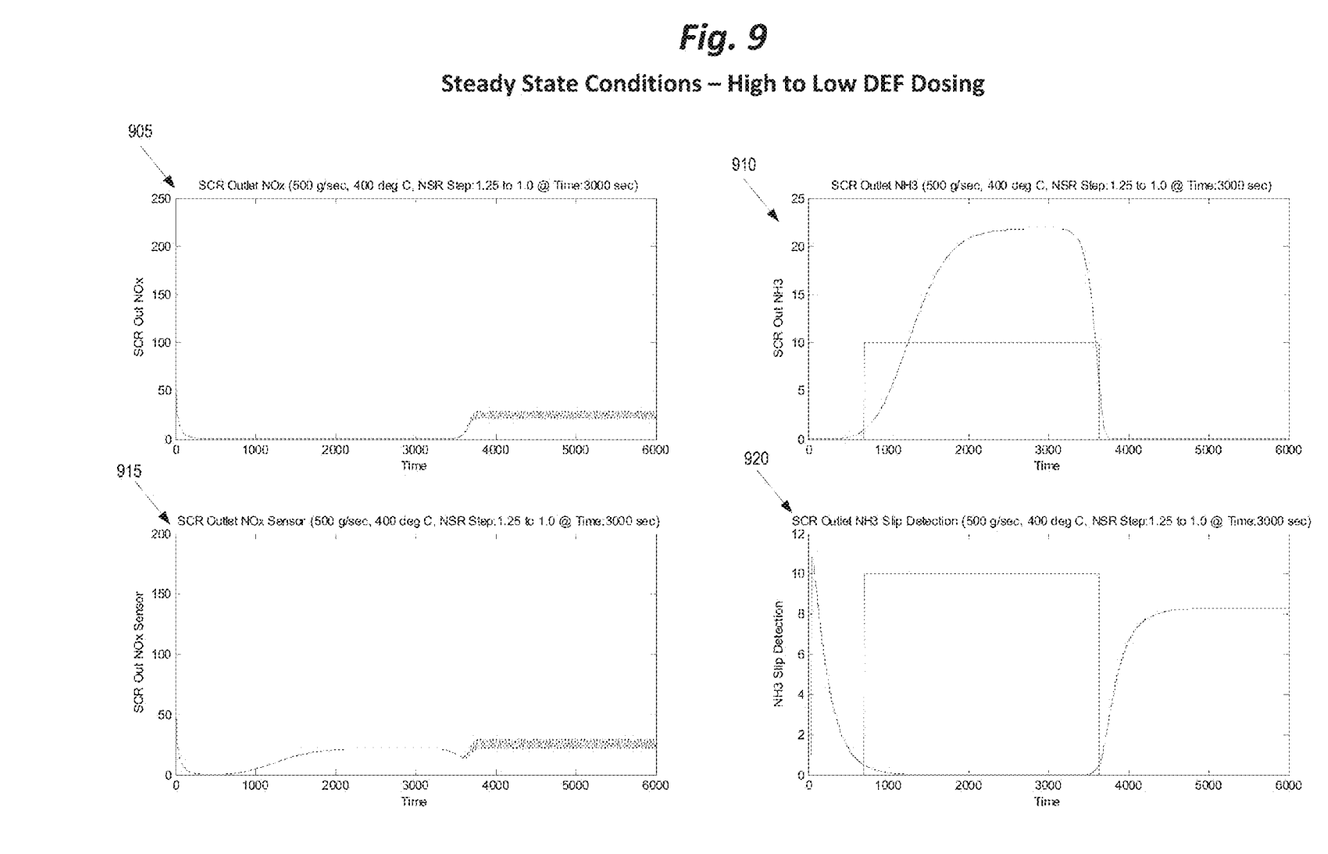
FIG. 9 is a set of graphs illustrating exhaust gas characteristics of the exhaust gas aftertreatment system of FIG. 1 when decreasing diesel exhaust fluid dosing during steady state engine conditions.
Figure 10:
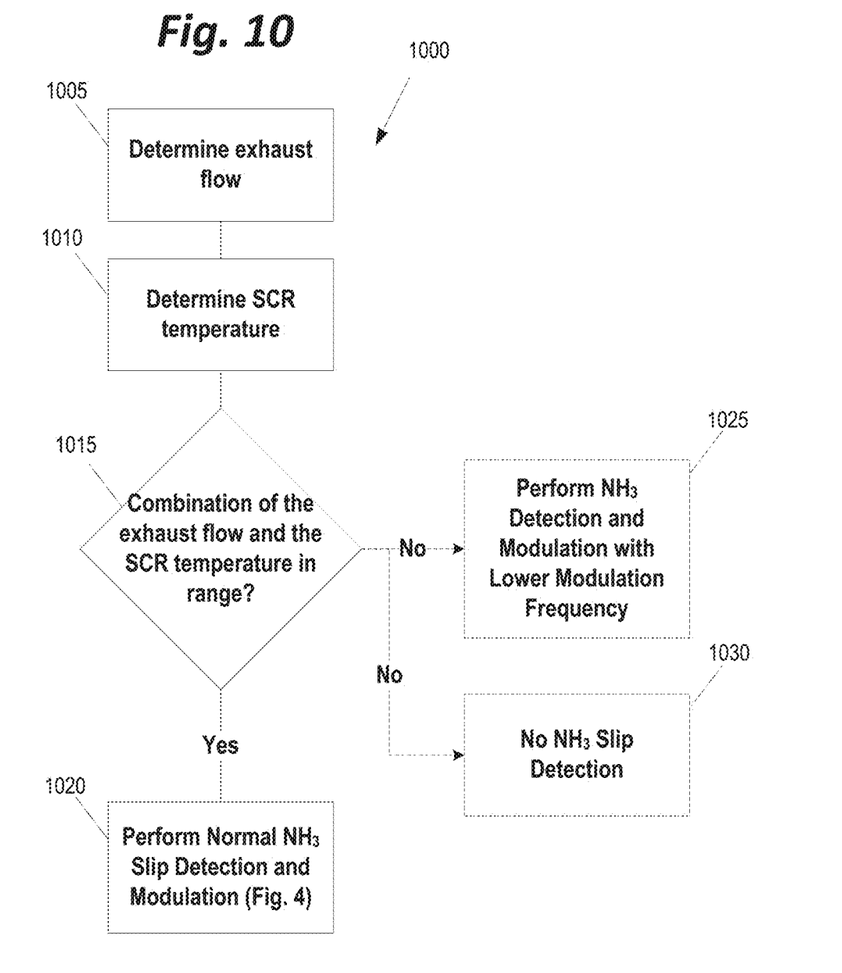
FIG. 10 is a flowchart of an adjustment method for diesel exhaust fluid modulation for the exhaust gas aftertreatment system of FIG. 1.
Figure 11:
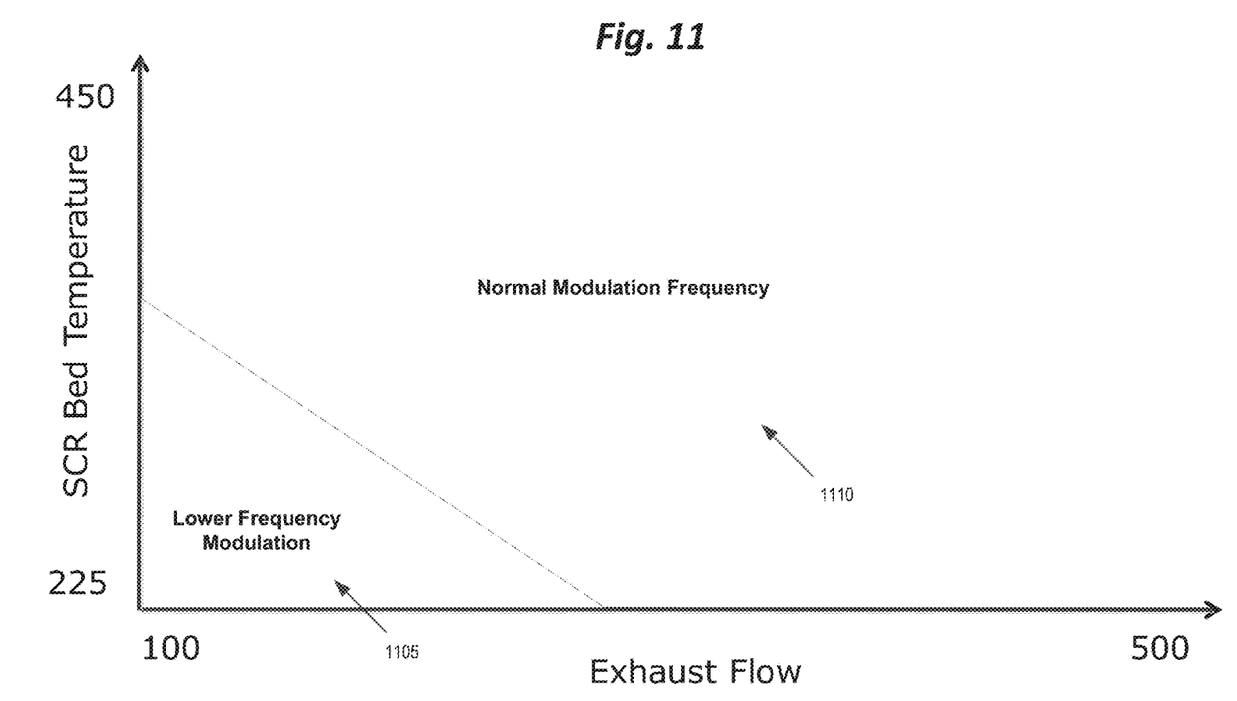
FIG. 11 is a graph of diesel exhaust fluid modulation frequency at a range of selective catalytic reduction bed temperatures and exhaust gas flow rates.

FIGS. 7-11 are sets of graphs illustrating a partial composition of the exhaust gas and reaction of the $NH_3$ slip flag for various operating conditions. In each of the figures, a top-left graph illustrates an actual $NO_x$ present at the outlet 119 over time. A bottom-left graph illustrates the signal of the sensor 109 over time. A top-right graph illustrates the actual $NH_3$ present at the outlet 119 over time. Lastly, a bottom-right graph illustrates the filtered signal from the sensor 109 and setting of the $NH_3$ flag over time. FIGS. 7-8 illustrate the partial composition during transient conditions (e.g., on a cold start-up of the engine) and FIGS. 9-11 illustrate the partial composition during steady state conditions (e.g., when the engine is at running temperature and the load is constant).

In particular, FIG. 7 is a set of graphs illustrating the partial composition of the exhaust gas and reaction of the $NH_3$ slip flag while increasing the amount of DEF dosing. The top-left graph 705 illustrates that the actual level of $NO_x$ output from the SCR chamber 107 drops as the DEF dosing is increased. The top-right graph 710 illustrates that the actual level of $NH_3$ increases once the SCR bed 113 is overdosed (i.e., saturated with $NH_3$). The bottom two graphs illustrate the signal response of the sensor 109 over the same time period. In the bottom-left graph 715, the signal level drops along with the actual $NO_x$ output. However, the signal level increases as the actual $NH_3$ level increases due to the sensitivity to $NH_3$ of the sensor 109. The bottom-right graph 720 illustrates that the filtered signal also decreases over time due to decreasing detection of $NO_x$. However, as long as the DEF dosing is insufficient, peak-to-peak variations in the filtered signal occur due to variations in $NO_x$. At approximately 3600 seconds, $NH_3$ begins to be sensed by the sensor 109 and the peak-to-peak variations due to the modulated DEF lessen below the threshold set by the ECU 200. The line 721 starting at approximately 3600 seconds indicates when the ECU 200 sets the $NH_3$ flag. It should be noted that once $NH_3$ is present at the outlet 119 of the SCR chamber 107, the modulation is no longer sensed by the sensor 109 because the modulated, injected DEF does not necessarily result in varying levels of $NH_3$ at the sensor 109.

FIG. 8 is a set of graphs illustrating the partial composition of the exhaust gas and reaction of the $NH_3$ slip flag while the amount of injected DEF is decreased rather than increased as in FIG. 7. In the top-left graph 805, the amount of actual $NO_x$ output from the SCR chamber 107 rapidly decreases as a high DEF dosage is applied. At approximately 1500 seconds, $NH_3$ starts exit the SCR chamber 107, as shown in the top-right graph 810. The bottom-left graph 815 illustrates the signal level indicating the increasing $NH_3$ as a smooth curve over a time interval 817. Over the time interval 817, the filtered signal, as shown in the bottom-right graph 820, has a peak-to-peak level below the threshold, and thus, the ECU 200 sets the $NH_3$ flag during the time interval 817. As illustrated, the $NH_3$ flag may rapidly set and reset at boundary conditions. However, the persistence check (see step 511) alleviates the rapid setting and resetting by introducing a time delay before the ECU 200 sets the $NH_3$ flag.

FIG. 9 is a set of graphs illustrating the partial composition of the exhaust gas and reaction of the $NH_3$ slip flag while the amount of injected DEF is decreased during steady state conditions. In the top-left graph 905, the actual $NO_x$ at the outlet 119 of the SCR chamber 107 is low due to a high initial dose of DEF. As the DEF dosing decreases, $NO_x$ begins to exit the SCR chamber 107 at approximately 3500 seconds. In the top-right graph 910, $NH_3$ appears at the outlet 119 due to the high initial dose of DEF, then decreases as the DEF dosing is lowered. The bottom-left left graph 915 illustrates that the signal of the sensor 109 increases due to $NH_3$ at the outlet 119, but remains steady. At approximately 3600 seconds, $NO_x$ appears at the outlet 119 and the ECU 200 determines that the peak-to-peak level is above the threshold. The bottom-right graph 920 illustrates that the ECU 200 sets the $NH_3$ flag during the steady $NH_3$ output interval and resets the $NH_3$ flag when the peak-to-peak level increases above the threshold thus indicating the presence of $NO_x$.

In FIGS. 7-9, the graphs illustrate exhaust gas conditions at normal flow rates and temperatures. However, when the exhaust gas aftertreatment system 100 experiences low flow rates and low temperatures of exhaust gas, the peak-to-peak level of the signal of the sensor 109 may be reduced. In order to compensate, in some implementations, the ECU 200 performs a control method 1000 for adjusting the rate of DEF modulation based on the temperature and flow rate, as shown in FIG. 10. The ECU 200 determines the amount of exhaust gas based on the flow sensor 123 (step 1005), and the ECU 200 also determines the temperature of the SCR bed 113 based on the temperature sensor 125 (step 1010). Next, the ECU 200 determines if a combination of the exhaust gas flow rate and the temperature of the SCR bed 113 is within a range (step 1015). The range may be set based on predetermined values stored in the memory 203 or may be calculated by the ECU 200 based on operating conditions of the exhaust gas aftertreatment system 100 or of the engine. If the combination of the exhaust flow and the temperature of the SCR bed 113 is in a normal operating range, the ECU 200 performs normal $NH_3$ slip detection (FIG. 5) and normal DEF modulation (FIG. 4) (step 1020). If the combination of the exhaust gas flow and the temperature of the SCR bed 113 is not in the normal operating range, then the ECU 200 either performs the $NH_3$ detection with a lower modulation frequency for the injected DEF (step 1025) or, alternatively, performs no $NH_3$ slip detection (step 1030). In the case when the ECU 200 does not perform $NH_3$ slip detection, the ECU 200 may operate in an open-loop or closed-loop control scheme and bypass the $NH_3$ slip detection method until conditions become more favorable.

FIG. 11 is an example of ranges of temperatures of the SCR bed 113 compared to exhaust gas flow rates. When the combination of the temperature of the SCR bed 113 and the exhaust gas flow rate fall within the range illustrated in the lower left 1105, the ECU 200 may operate with a lower DEF modulation frequency or may suspend $NH_3$ slip detection (as described in FIG. 10). Conversely, when the combination of the temperature of the SCR bed 113 and the exhaust gas flow rate fall within the range illustrated in the upper right 1110, the ECU 200 operates with a normal DEF modulation frequency. It should be noted that these ranges are exemplary and other ranges and combinations of parameters may be selected while implementing the control method 1000.

Various features of the disclosure are set forth in the following claims.

What is claimed is:

1. An exhaust gas treatment system for regulating $NO_x$ emissions in an internal combustion engine including diesel exhaust fluid (DEF), the system comprising:
   an exhaust gas pathway that is configured to receive exhaust gas from the internal combustion engine;
   a DEF injector connected to the exhaust gas pathway, the DEF injector configured to inject diesel exhaust fluid into the exhaust gas pathway;
   a selective catalytic reduction (SCR) chamber positioned downstream of the diesel exhaust fluid injector;
   a sensor positioned downstream of the SCR chamber, the sensor outputting a signal indicative of an amount of nitrogen oxides and reductant present in the exhaust gas; and
   an electronic control unit that is configured to
      modulate an amount of DEF that is injected into the exhaust gas pathway at a known frequency,
      receive the signal from the sensor,
      filter the signal based on the known frequency,
      analyze the filtered signal to determine a component of the signal associated with the known frequency,
      determine that the signal is indicative of an amount of nitrogen oxide when the component of the filtered signal is above a threshold, and
      determine that the signal is indicative of an amount of reductant when the component of the filtered signal is below the threshold.

2. The exhaust gas treatment system of claim 1, further comprising:
   a DEF supply communicatively coupled to the electronic control unit, the DEF supply including a DEF tank configured to store DEF,
   wherein the DEF tank is fluidly connected to the DEF injector, and
   wherein the DEF supply is configured to adjust the amount of DEF that is injected into the exhaust gas pathway.

3. The exhaust gas treatment system of claim 1, wherein the SCR chamber includes a SCR catalyst and an ammonia oxidizing catalyst.

4. The exhaust gas treatment system of claim 1, wherein the sensor is a nitrogen oxide ($NO_x$) sensor.

5. The exhaust gas treatment system of claim 1, wherein modulation of the amount of DEF includes modulating the DEF in a sinusoidal manner such that the amount of injected DEF over time remains the same as that without modulation.

6. The exhaust gas treatment system of claim 5, wherein modulating the DEF occurs at a frequency of approximately 1/40 Hertz and at an amplitude of approximately 20 to 30 percent of the amount of injected DEF.

7. The exhaust gas treatment system of claim 1, further comprising
   a temperature sensor connected to the exhaust gas pathway, the temperature sensor configured to send a temperature signal to the electronic control unit indicative of a temperature of a selective catalytic reduction chamber, and
   an exhaust gas flow sensor connected to the exhaust gas pathway, the exhaust gas flow rate sensor configured to send an exhaust gas flow rate signal to the electronic control unit.

8. The exhaust gas treatment system of claim 7, wherein the electronic control unit is further configured to adjust the known frequency of modulation based on the temperature signal and the exhaust gas flow rate signal.

9. The exhaust gas treatment system of claim 7, wherein the threshold is set based on the temperature signal and the exhaust gas flow rate signal.

10. The exhaust gas treatment system of claim 1, wherein the component is a peak-to-peak variation in the signal at the known frequency, and wherein the electronic control unit is configured to compare the peak-to-peak variation to the threshold.

11. The exhaust gas treatment system of claim 1, wherein the threshold is a value of a specific peak-to-peak variation of the component of the filtered signal that indicates a transition between a predominant $NH_3$ component and a predominant $NO_x$ component.

12. The exhaust gas treatment system of claim 1, wherein the electronic control unit includes a band-pass filter with a center frequency at the known frequency.

13. A method of controlling an exhaust gas aftertreatment system including diesel exhaust fluid (DEF), the method comprising:
   modulating an amount of diesel exhaust fluid (DEF) that is injected into an exhaust gas pathway at a known frequency;
   receiving a signal from a sensor downstream of a point of injection of the DEF;
   filtering the signal based on the known frequency;
   analyzing the filtered signal to determine a component of the signal associated with the known frequency;
   determining that the signal is indicative of an amount of nitrogen oxide when the component of the filtered signal is above a threshold; and
   determining that the signal is indicative of an amount of reductant when the component of the filtered signal is below the threshold.

14. The method of claim 13, wherein modulating the amount of DEF includes modulating the DEF in a sinusoidal manner such that the amount of injected DEF over time remains the same as without modulation.

15. The method of claim 14, wherein modulating the DEF occurs at a frequency of approximately 1/40 Hertz and at an amplitude approximately 20 to 30 percent greater than the amount of injected DEF.

16. The method of claim 13, further comprising:
   sending a temperature signal to the electronic control unit indicative of a temperature of a selective catalytic reduction chamber, and
   sending an exhaust gas flow rate signal to the electronic control unit indicative of an amount of exhaust gas flow.

17. The method of claim 16, further comprising adjusting the known frequency of modulation based on the temperature signal and the exhaust gas flow rate signal.

18. The method of claim 16, wherein the threshold is set based on the temperature of the selective catalytic reduction chamber and the amount of exhaust gas flow.

19. The method of claim 13, wherein the component is a peak-to-peak variation in the signal at the known frequency, the method further comprising comparing the peak-to-peak variation to the threshold.

20. The method of claim 13, wherein the threshold is a value of a specific peak-to-peak variation of the component of the filtered signal that indicates a transition between a predominant $NH_3$ component and a predominant $NO_x$ component.

* * * * *